No. 761,665. PATENTED JUNE 7, 1904.
J. L. DURHAM.
PLANTER.
APPLICATION FILED NOV. 4, 1902.
NO MODEL. 2 SHEETS—SHEET 1.
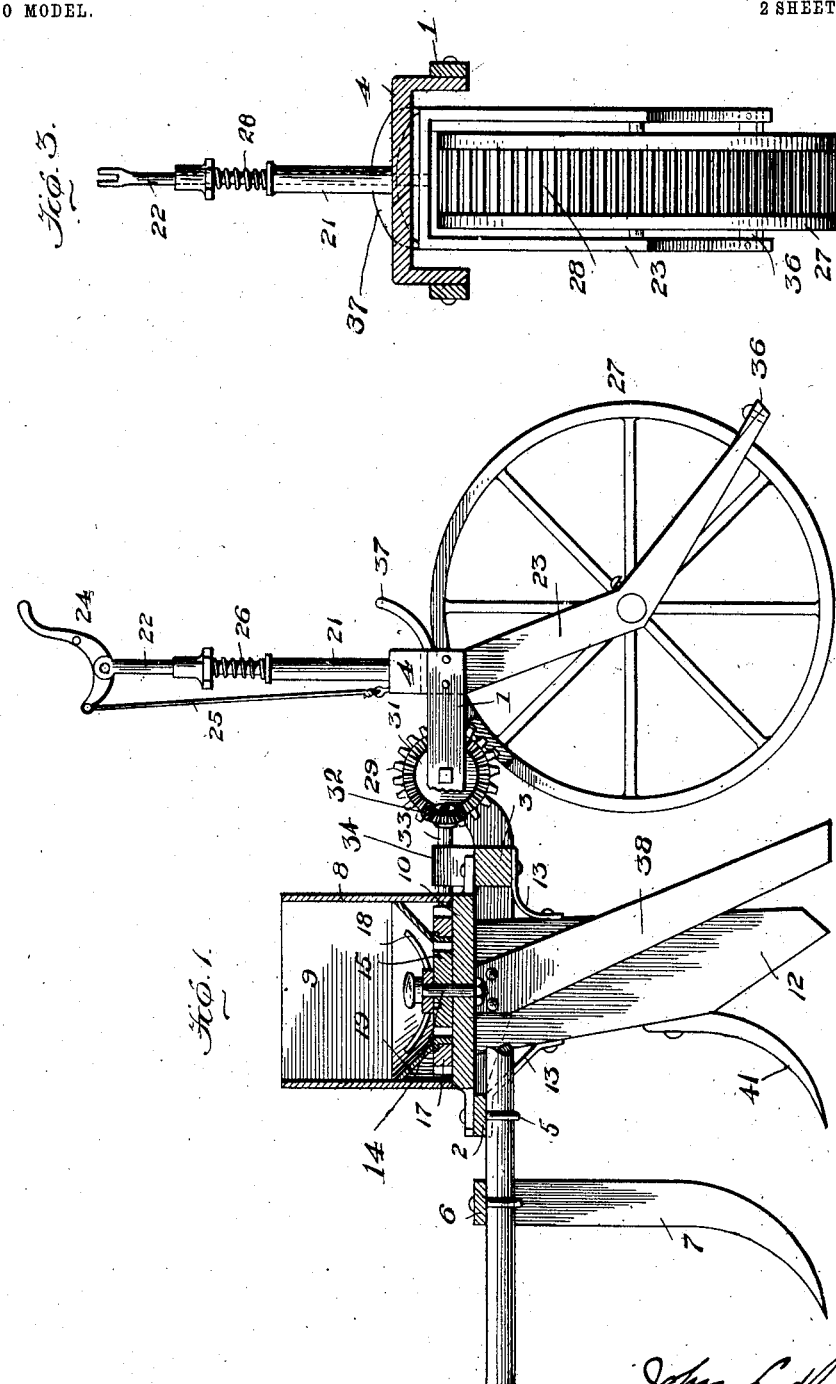

No. 761,665. PATENTED JUNE 7, 1904.
J. L. DURHAM.
PLANTER.
APPLICATION FILED NOV. 4, 1902.
NO MODEL. 2 SHEETS—SHEET 2.
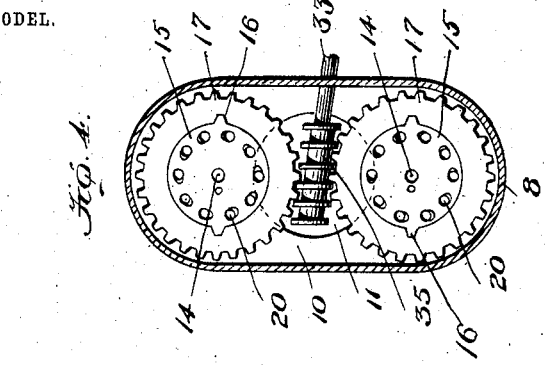
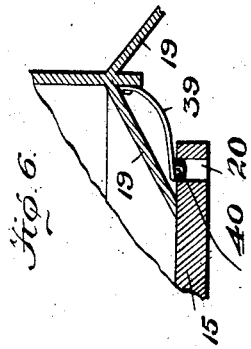
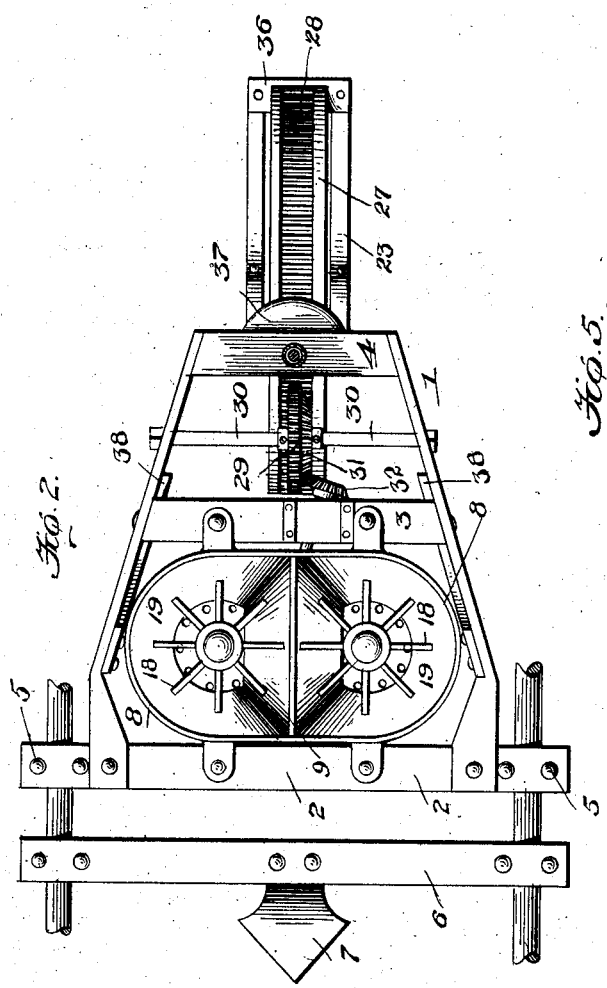
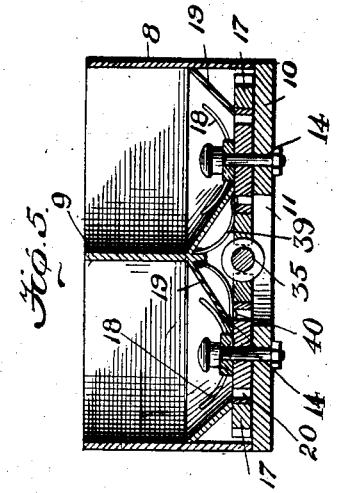
Inventor
John L. Durham
Witnesses
Henry N. Copp
Attorney No. 761,665. Patented June 7, 1904.

UNITED STATES PATENT OFFICE.

JOHN LANDRUM DURHAM, OF SANCO, TEXAS.

PLANTER.

SPECIFICATION forming part of Letters Patent No. 761,665, dated June 7, 1904.

Application filed November 4, 1902. Serial No. 130,115. (No model.)

*To all whom it may concern:*

Be it known that I, JOHN LANDRUM DURHAM, a citizen of the United States, residing at Sanco, in the county of Coke and State of Texas, have invented certain new and useful Improvements in Planters; and I do hereby declare the following to be a full, clear, and exact description of the invention, such as will enable others skilled in the art to which it appertains to make and use the same.

This invention relates to improvements in planters, and has for its object to provide a simple and cheap construction of planter which will be adapted for use with any and all kinds of seed and can be attached to any cultivator or sulky.

A further object is the means provided for dropping two kinds of seed or one-kind of seed and a fertilizer intermittently or simultaneously.

A still further object is the provision of novel means for throwing out of operation the agitating and seed-dropping mechanism when turning.

With these objects in view the invention consists of the novel combinations and the construction, arrangement, and adaptation of parts, which will be more fully described hereinafter and then pointed out in the appended claims.

In the accompanying drawings, Figure 1 is a side elevation, partly in section, and shown connected to the beams of a cultivator. Fig. 2 is a top plan view. Fig. 3 is a view of the caster-wheel looking from the front of the machine and omitting the rest of the mechanism. Fig. 4 is a plan view of the grain-hopper, seed-plates, and worm-gearing. Fig. 5 is a transverse section taken through the grain-hopper, and Fig. 6 is a sectional detail of the means for forcing the grain from the feed-orifice.

Referring more especially to the drawings, the frame of the machine is made up of the side bars 1 and cross-beams 2, 3, and 4, which brace the structure, the cross-beam 2 being secured to the framework of a cultivator by U-bolts 5. Just forward of the beam 2 is a similar beam 6, on which is located a furrow-opener 7, adapted to open the ground for the seed.

Supported by the beams 2 and 3 is an elongated hopper 8, which is divided in two by a central removable partition 9 and whose bottom 10 is provided with an opening 11, through which the seed drops into the chute 12 and thence into the earth. This chute is supported by angle-iron braces 13, secured to the beams 2 and 3.

Rotatably mounted on stud-pins 14, which are centrally located in each divided half of the grain-hopper are grain-plates 15, having lugs 16, adapted to engage teeth in the gear-rings 17, which surround the grain-plates 15. On top of the grain-plates 15 and mounted on the stud-pins 14 are agitators 18, consisting of a central plate which is secured to the grain-plate 15, having fingers radiating upward and outward from said central plate within the hopper, and resting on top of the grain-plate 15 is a guard 19, the shape of which is best seen in Fig. 5. The central part of this guard is raised so as to permit the access of suitable gearing and is connected to the partition 9. The inner edges of the part of the guard that projects downward from the partition 9 are extended over a number of the holes 20 in the grain-plates and prevent the seed from running through that one which is in register with the opening 11. Secured to a projection on the partition 9 is a spring 39, having a lug 40, which is adapted to engage each hole 20 as it comes in register with the opening 11.

The beam 4 is of inverted-U-shaped construction, and raised therefrom is a tubular bearing 21, adapted to receive a rod 22, projecting from the caster-wheel frame 23, and on which is pivoted the lever 24, adapted to raise the frame 1 through the medium of the rod 25 against the action of the spring 26 on the rod 22.

Journaled within the frame 23 is a caster-wheel 27, having the gear-teeth 28 in its periphery adapted to engage a gear 29, journaled on a shaft 30 midway between the beams 3 and 4. This gear 29 is provided with a bevel-gear 31 on its side, which engages a gear 32 on a shaft 33. This shaft is suitably mounted in a bearing 34 on the beam 3 and carries the worm-gear 35, which meshes with the gear-rings 17.

On the lower end of the frame 23 is a scraper 36, adapted to scrape the caster-wheel 27, and the upper part of the frame is provided with a cam-shaped plate 37, adapted to contact with the under side of the beam 4 and raise the frame 1.

Secured to the chute 12 is a plow-point 41, adapted to assist the furrow-opener 7 in keeping the ground open for the seed to fall into. To the sides of the frame 1 are secured two covering-blades 38, one on each side of the frame 1 and extending back of the chute 12.

The operation is as follows: The gear-wheel 29, meshing with the teeth 28 of the caster-wheel 27, gives motion to the shaft 33 and worm-gear 35 thereon through the gear 32. This worm-gear 35 meshes with the gear-rings 17 and carrying the grain-plates 15 gives them rotation. As the holes in the plates are filled and carried past the guard 19 and come into register with the opening 11 the lugs 40 on the springs 39 engage the holes and force the grain to drop in the chute 12. When the machine is turned at the end of the row, the stem of the caster-wheel being revolubly mounted in the bearing 21 assumes a different position and engages the beam 4 and causes it to ride up over it. This action disengages the gear 29 from the teeth 28 of the caster-wheel 27, thus throwing out of operation the entire seed-dropping mechanism. When the machine is started on another row, the caster-wheel comes straight, and the cam-piece no longer bears against the under side of the beam, thus allowing the frame to drop and the wheel 29 to engage the teeth of the caster-wheel, starting the seed-dropping mechanism.

Having thus described my invention, what I claim as new, and desire to secure by Letters Patent, is—

1. In a seeder, the combination with a frame adapted to support the seeding mechanism, means partially supporting said frame for operating the seeding mechanism, automatic means for throwing out of operation said seeding mechanism, and means independent of said automatic means for throwing the seeding mechanism out of operation.

2. In a seeder, the combination with a framework adapted to support the seeding mechanism, means partially supporting the frame for operating the seeding mechanism, and automatic means on said supporting means for throwing out of operation said seeding mechanism.

3. In a seeder, the combination with a frame adapted to support the seeding mechanism, of means partially supporting the frame and adapted to give motion to the seeding mechanism, and automatic means for throwing out of operation said seeding mechanism when the machine is turning.

4. In a seeder, the combination with a frame adapted to support a seeding mechanism, means for partially supporting said framework, said means giving motion to a gear, said gear operating means whereby the seeding mechanism is set in motion, and automatic means for throwing said gear out of engagement with said partial supporting means.

5. In a seeder, the combination with a seeding mechanism, of a frame adapted to support said seeding mechanism, a gear for operating said seeding mechanism, means for partially supporting the rear of said frame, said means giving motion to the gear, said gear operating means setting the seeding mechanism in motion, and automatic means connected to said partial supporting means for throwing said gear out of engagement with said supporting means.

6. In combination with a seeder, a hopper supported by the framework of said seeder, means operating in said hopper for dropping one kind of seed, another means operating in said hopper for dropping another kind of seed, and a worm-gear interposed between the operating means for driving both.

7. In combination with a seeder, a hopper secured upon the framework thereof, of means within said hopper for dropping alternately two kinds of seed, and automatic means for rendering said seed-dropping means inoperative.

8. In combination with a seeder, a divided hopper supported by the framework of said seeder, means operating in one side of said hopper for dropping one kind of seed, another means operating in the opposite side of said hopper for dropping another kind of seed and a worm-gear in engagement with both operating means for operating them.

9. In a seeder, the combination with a hopper, of means revolubly mounted within said hopper and having apertures for the reception of seed, means dividing said hopper and covering certain of said apertures, and spring means secured to a part of said dividing means for forcing the seed through said apertures.

10. In a seeder, the combination with a frame supported by a cultivator, of a caster-wheel supporting the rear of said frame and pivoted therein, teeth in the periphery of said caster-wheel, the gear meshing with said teeth and the caster-wheel, and a cam-plate secured to the upper portion of the caster-wheel frame adapted to raise the frame and disengage the gear from the caster-wheel.

11. In a seeder, the combination with a frame supported by a cultivator, of a caster-wheel supporting the rear of said frame and pivoted therein, teeth in the periphery of said caster-wheel, the gear meshing with said teeth and the caster-wheel, a rod secured to said caster-wheel frame and journaled in a bearing on the seeder-frame, a lever pivoted on said rod, and means connecting said lever and seeder-frame, for raising the gear out of engagement with the caster-wheel.

JOHN LANDRUM DURHAM.

Witnesses:
   J. W. BARNETT,
   W. B. GREEN.